United States Patent [19]

Williams et al.

[11] Patent Number: 5,024,494
[45] Date of Patent: Jun. 18, 1991

[54] FOCUSSED LIGHT SOURCE POINTER FOR THREE DIMENSIONAL DISPLAY

[75] Inventors: Rodney D. Williams, Plano; Felix Garcia, RoundRock, both of Tex.

[73] Assignee: Texas Instruments Incorporated, Dallas, Tex.

[21] Appl. No.: 482,471

[22] Filed: Feb. 21, 1990

Related U.S. Application Data

[63] Continuation-in-part of Ser. No. 390,473, Aug. 3, 1989, which is a continuation of Ser. No. 231,638, Aug. 8, 1988, abandoned, which is a continuation of Ser. No. 105,924, Oct. 7, 1987, abandoned.

[51] Int. Cl.$^5$ ............................................. G03H 1/02
[52] U.S. Cl. ..................................... 350/3.6; 353/10; 353/42
[58] Field of Search .......................... 353/10, 30, 42; 350/3.6, 144

[56] References Cited
U.S. PATENT DOCUMENTS 3,233,507  2/1966  Baruch ................................. 350/30
4,659,172  4/1987  Cavan .................................. 350/3.6
4,834,473  5/1989  Keyes, IV et al. ................. 350/144

*Primary Examiner*—Bruce Y. Arnold
*Assistant Examiner*—J. P. Ryan
*Attorney, Agent, or Firm*—L. Joy Griebenow; James T. Comfort; Melvin Sharp

[57] ABSTRACT

The disclosure relates to a pointer for a three dimensional display wherein a scanned light beam is displayed upon a rotating display member rotating about a fixed axis for receiving and displaying the scanned light beam on a first surface thereof, fixed points in the display impinging upon the display member to display a harmonic motion along an axis passing through the scanned light beam in response to rotation of the display means. A beam of focussed light, preferably from a laser is modulated to synchronize with rotation of the display member to provide a visible point in the display at a predetermined location therein. A second embodiment provides an encoder, light conducting rod bundle and sensor to determine the three dimensional location of the point denoted by the pointer.

12 Claims, 3 Drawing Sheets

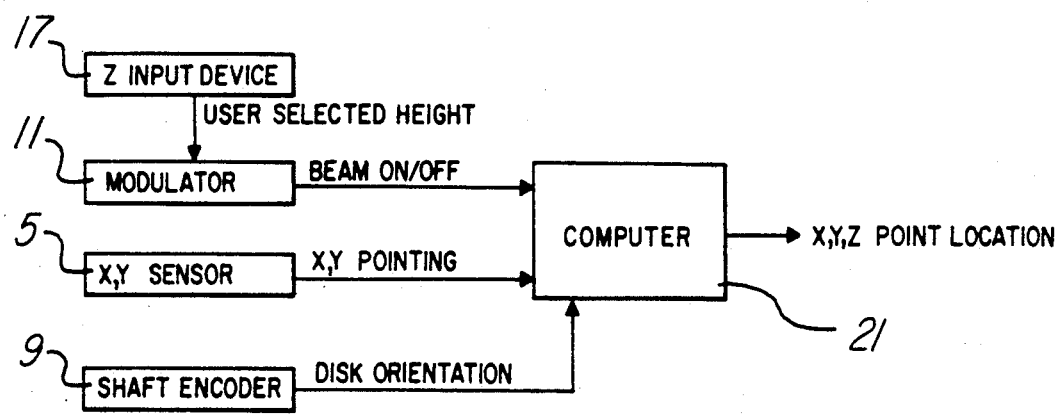
FIG. 4
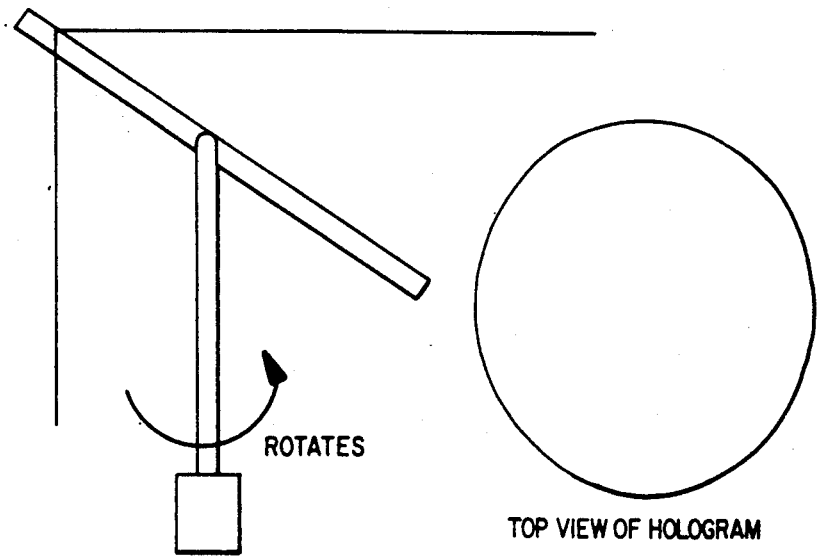
A SPINNING HOLOGRAM
FIG. 5
TOP VIEW OF HOLOGRAM
FIG. 5'

FOCUSSED LIGHT SOURCE POINTER FOR THREE DIMENSIONAL DISPLAY

CROSS REFERENCE TO PRIOR APPLICATIONS

This application is a continuation in part of U.S. Ser. No. 07/390,473, filed Aug. 3, 1989, which is a continuation of U.S. Ser. No. 07/231,638, filed Aug. 8, 1988, now abandoned, which is a continuation of U.S. Ser. No. 07/105,924, filed Oct. 7, 1987, now abandoned.

BACKGROUND OF THE INVENTION

1. Field of the Invention

This invention relates to a pointer for a three dimensional display system and, more specifically, to a modulated focussed light source for locating a point in three dimensional space in a real time three dimensional display.

2. Brief Description of the Prior Art

It has been known in the prior art to modulate or scan a beam, such as a laser beam and then to project the scanned beam onto a screen. Examples of such systems are set forth in Baker Patent Nos. 3,471,641 and 3,549,800.

A system which is superior to the systems denoted hereinabove and other known systems is disclosed in the copending application of Felix Garcia, Jr., Serial No. 07/390,473, filed Aug. 3, 1989, the disclosure of which is incorporated herein by reference. In accordance with the system set forth therein, there is provided a three dimensional display system which is not substantially affected by G forces and wherein the size of the displayed image and screen is determined by the size of a disk and motor. The system can be used, for example, in business and industrial uses, such as solid animation, radar display, molecular research, resonant frequency and harmonics display, military, computer graphics and the like.

The system includes a disk-like screen connected to the end of a motor shaft. The disk is attached to the shaft of a motor preferably at a 45 degree angle to the shaft, though this angle can be varied to provide a larger or smaller height or z-axis dimension so that, as the disk rotates, a displacement of any given point thereon along the z axis takes place. The image is formed on the screen by projecting a light beam, such as from a laser, through a modulator and toward a scanner which produces an x-y scan of the beam on a screen, the screen herein being the disk discussed hereinabove. The disk can be translucent, such as lucite, so that images can be projected thereon onto the front and/or rear surfaces thereof.

The modulation or strobing of the scan is synchronized with the rotating disk by control of the motor speed and/or the strobe rate so that a three dimensional pattern appears on the screen. It can be seen that any point on the x-y scan from the scanner which impinges upon the screen will move along a z-axis direction since the screen or disk at that point produces such z-axis movement. This movement of the displayed image provides the three dimensional effect. The adjustment of the angle between the disk surface and the x-y plane of the scanned x-y image will determine the z dimension or height of the three dimensional image, the disk angle being adjustable on-line, if so desired.

The disk is preferably a planar opaque screen for receiving a scanned image thereon on one surface thereof. The screen can, however, take different forms such as, for example, being translucent, such as lucite, and thereby being capable of receiving a scanned image thereon on both major surfaces or transmitting images received on one surface thereof to the opposing surface for viewing or other operation. The lucite disk can be in the form of a pair of angularly truncated cylinders which fit together at the angularly truncated surfaces to form a new cylinder wherein the surfaces at which truncation takes place are translucent. In addition, the screen can take on shapes other than planar, it merely being necessary that at least some portion thereof move in the z-direction during rotation thereof while projection of the x-y image thereon takes place to provide the three dimensional image. Furthermore, the disk can be placed in a gas filled CRT with the image impinging thereon being the scanned beam of the tube. Phosphors can be disposed on the disk which, when excited, form the three dimensional image. Still further, the screen can be planar and disposed normal to the projected x-y image.

While the above described application of Garcia provides a real time autostereoscopic multiplanar 3-D display system, there has been no provision for accurately locating and pointing to any point within the display in real time apart from the scanner itself, such as by directing a pointer to a specific point in the display to point out items during the course of a lecture or discussion in the manner of a pointer on a motion picture screen.

SUMMARY OF THE INVENTION

In accordance with the present invention, the above noted problem of the prior art is minimized and there is provided a focussed light source which can selectively locate and illuminate any predetermined point or points in a display of the above described type from a location outside of the display. Briefly, in accordance with the present invention, there is provided a pointer system which includes a modulated light source, preferably a modulated laser, which can be positioned relative to the display, such as by hand, to strike a predetermined point or points therein in three dimensions. The light beam from the light source is modulated on and off in synchronism with the rotation of the display so that the light from the light source always impinges upon the predetermined point or points on the display when the predetermined point or points are at a predetermined location in their field of rotation. In this way, there is provided a pointer, the light from which can strike any point in the 3-D display volume since any point on the disk can have light from the source impinge thereon at any point in the rotary path of that point.

In accordance with a second embodiment of the invention, in order to encode the location of the point in space on which the point or points of light are impinging, the disk is made transparent or translucent so that the light impinging thereon can pass therethrough. A plurality of light pipes are disposed on the side of the disk opposite from the display and rotate with the disk. Light impinging on the disk passes therethrough and through the light pipes to a sensor composed of plural sensing elements, the sensing elements determining the x-y location of the light impinging thereon. In addition, an encoder provides an indication of the instantaneous rotary position of the disk from which the x-location can be determined. It can therefore be seen that the location of the point in space selected by the pointer is determined by the point on the disk on which the light impinges, this being determined by the particular light pipe illuminated by the pointer, and the position of the disk in its trajectory, this being determined by the encoder on the shaft driving the disk.

BRIEF DESCRIPTION OF THE DRAWINGS

FIG. 4 is a further block diagram showing operation of the user interface synchronizing software; and FIGS. 5 and 5' illustrate the operation of the holographic plate.

DESCRIPTION OF THE PREFERRED EMBODIMENTS

Figure 1:
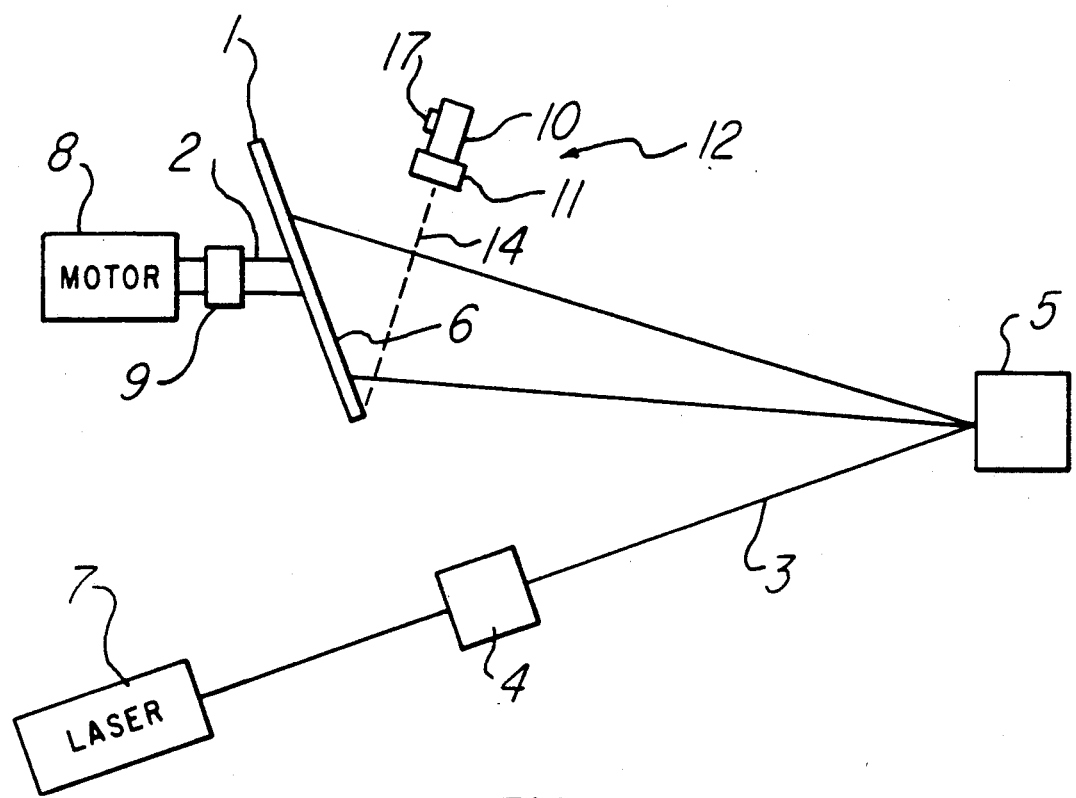
FIG. 1 is a schematic diagram of a three dimensional display system utilizing a screen in accordance with a first embodiment of the present invention.
Figure 2:
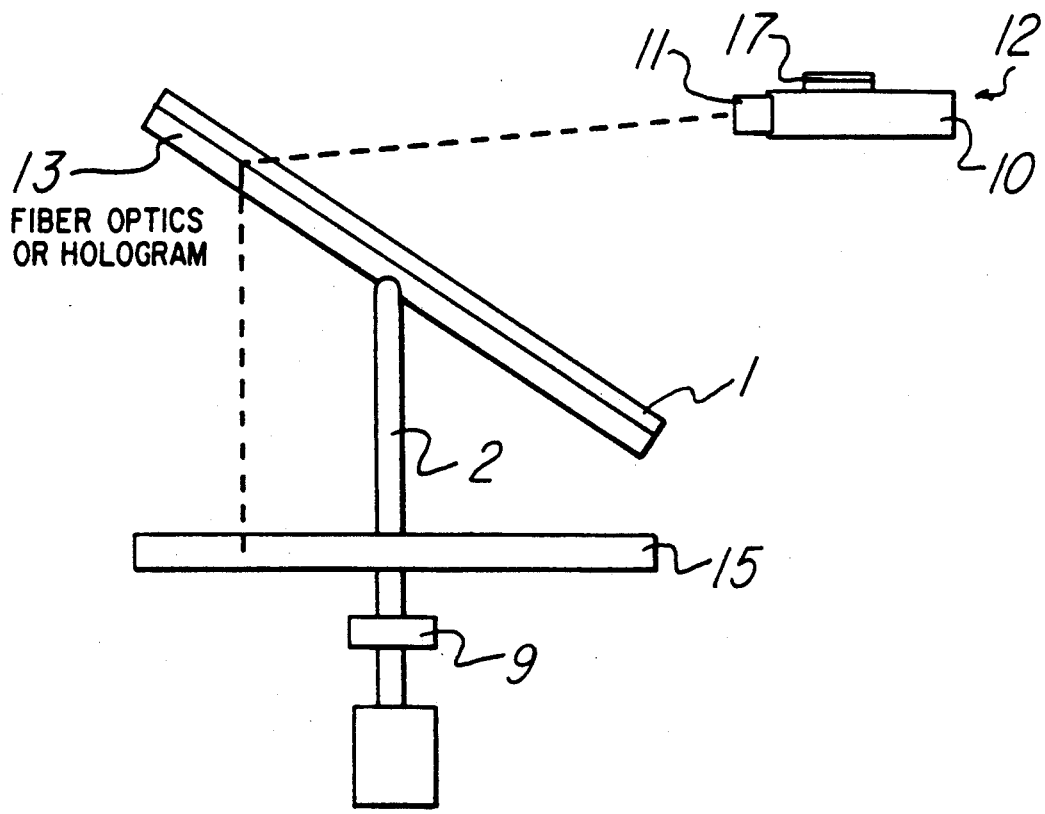
FIG. 2 is a diagram in accordance with a second embodiment of the invention showing location of the light spot on the display disk.

Referring now to FIG. 1, there is shown a schematic diagram of a system in accordance with the present invention. The system includes a laser 7 which projects a light beam through a modulator 4 onto an x-y scanner 5. The modulator 4 is externally controlled in predetermined manner (not shown) to control the intensity of the laser light beam 3 passing therethrough to the x-y scanner 5. It is understood that the light intensity can be controlled so that no light passes through the modulator when so desired, either by use of a light valve or by deflection of all or a portion of the light beam from the light beam path 3 as shown. The x-y scanner 5, whose scanning rate is externally controllable in standard manner (not shown), scans the light beam 3 from the modulator along an x-y plane and projects this x-y image 6 onto a screen 1, preferably in the form of a disk as will be explained hereinbelow. The screen 1 is rotated by a motor 8 via a shaft 2 to which the screen is secured, the motor speed being controllable by means of a standard controller (not shown). The motor speed is preferably synchronized with the scanning rate of the scanner 5. As is well known, the disk 1 will preferably have a rotational speed in excess of eighteen revolutions per second to avoid flickering and the like. One typical circuit for providing such synchronization is shown in FIG. 2 of the above noted Garcia, Jr. application so that the same spot on the disk is always present to receive a particular part of the x-y scan projected thereon.

The screen 1 can be a rigid standard type movie screen if it is to be viewed from only one side thereof, as for the system described herein thus far. The screen angle is preferably 45 degrees with respect to the image received from the scanner, however, this angle can be altered up to about but less than 45 degrees in either direction, the effect of such angle alteration being to vary the height or z-dimension of the displayed image with continued change in such angle. The screen angle can be made variable on line, if so desired, by a structure (not shown) of known type which rotates the screen on the shaft 2. The screen 1 need not be planar but can be undulating or take many other shapes.

A pointer 12, which provides a narrow beam light source and is shown as a laser 10 and a modulator 11, is preferrably hand held and is provided to transmit a narrow beam of light 14 onto the disk or screen 1. In order for this narrow beam to appear as a point in space and strike the disk 1 once per disk revolution at the same spot, the light beam 14 is modulated on and off by the modulator 11 which permits the light beam to be on for only a small instant during each revolution of the shaft 2. The disk 1 rotates in synchronism with the modulator 11 and shaft encoder 9 for the x and y inputs. The z input is + or − out of synchronization for random selection of a spot on the disk 1. The out of synchronism z input which determines the height of the image enters the modulator 11 via controller 17 located on the pointer 10.

In operation, with the display system operating in the manner described in the above noted Garcia, Jr. application, a light beam from the laser 7 is modulated by the externally controllable modulator 4 to provide a modulated beam 3 which strikes the x-y scanner 5, the latter having an externally controllable scanning rate. The scanner 5 scans the light beam in an x-y plane onto the rotating disk or screen 1, the speed of rotation of the screen 1 being synchronized to the scanning rate of the scanner 5. As has been explained hereinabove, any point of light in the x-y plane impinging upon the screen 1 will display a harmonic type motion in the z-plane due to the similar movement of points on the screen. Accordingly, if the scanning rate of the scanner and the rotation rate of the screen are sufficiently high, light impinging upon the screen at any point on the screen will move along the z-axis sufficiently rapidly to appear as a complete line, as is well known. The result is a three dimensional display with height determined by the angle of the screen relative to the direction of the impinging light, this angle being determined by the z-input.

During display operation as described hereinabove, in the event a predetermined point in the three dimensional display space is to be highlighted or pointed out, the pointer 10 composed of laser 10 and modulator 11 is turned on and aimed so that the light beam 14 therefrom will impinge upon the selected point in space. At some time during rotation of the disk 1, the desired point in space will rest on the surface of the disk at least once per disk revolution. At that time or times, during each revolution of the disk, the modulator 11 momentarily modulates or turns on the beam from the laser 10 in known manner as explained hereinabove so that light from the laser impinges on the disk 1 to provide a point illuminating source. It is readily apparent that the light beam 14 can be greater than a point source, such as, for example, in the shape of an arrow, with appropriate synchronization of the modulator 11 to permit an arrow to appear at the predetermined location in space due to the impingement of light from many point sources in the shape of an arrow or from a single source in the shape of an arrow on the disk 1.

Figure 3:
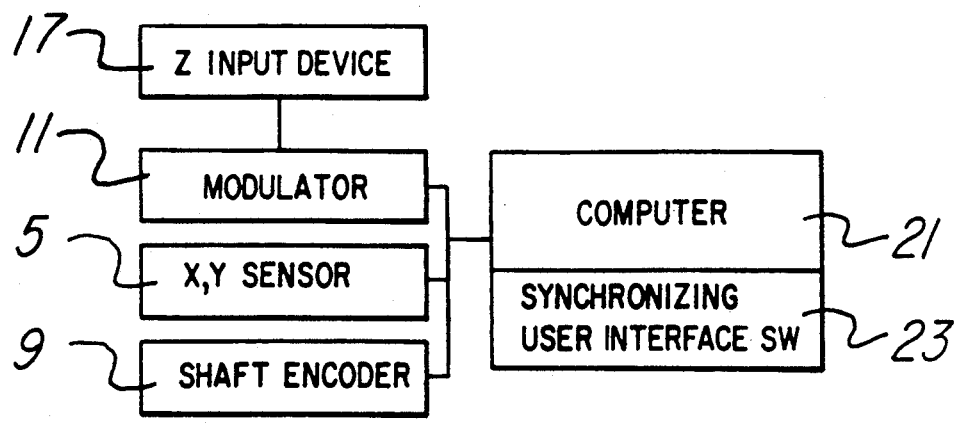
FIG. 3 is a block diagram of the control system circuit.

A typical control system for controlling the synchronization of the modulator 11 relative to the rotational speed of the disk 1 is set forth in FIGS. 3 and 4 wherein it can be seen in FIG. 3 that a computer 21 is under control of synchronizing user interface software 23 which provides synchronization signals and data signals to the computer. The computer 21, in response to the data and synchronizing signals provides the necessary information to each of the x-y sensor 5, the shaft encoder 9, the modulator 11 and the z input device 17 via the modulator to provide control thereof.

It can be seen with reference to FIG. 4 that there is also a feedback of information to the computer 21 from the z input 17 via modulator 11 to the computer 21 indicative of the user selected height, the modulator 11 indicative of when the beam 14 is on or off, the x,y sensor 5 indicative of x,y pointing and the shaft encoder 9 indicative of the rotational position of the disk 1. The computer provides an output of x, y and z point locations of the beam 14.

To define the timing relationship of the disk 1 to the sensor 15:

for Time=1: $(X_1,Y_1)(Rho\ M_i)=X,Y,Z$, at t=1, where i is the position of the z input device or switch 17, $Rho_1$ is the disk angle as determined by the shaft encoder 9 and $X_1,Y_1$ is the output of the sensor 15 at time T=1

$Z=(Rho_1\ M_i)$ at t=1 and switch 17 at position i, for Time=2: $(X_2,Y_2)(Rho_2,M_i)=X,Y,Z$ for t=2.

The voxels (volume pixels) at the extreme top and bottom of the display volume can be defined as follows:

for Z Maximum:$=(X_t,Y_t)(Rho_t,\ M_{max})=X,Y,Z$ at time t.

for Z Minimum:$=(X_t,Y_t)(Rho_t,\ M_{min})=X,Y,Z$ at time t.

Referring now to FIG. 2, there is shown a second embodiment of the invention wherein the disk 1 of FIG. 1 is rendered transparent or translucent and capable of transmitting light therethrough and whereby the specific location of a point on the disk 1 at which the light impinges can be determined. This is accomplished as in the embodiment of FIG. 1 by providing a shaft encoder 9 of standard design which is associated with the shaft 2 to provide an indication of the instantaneous angular position of the shaft and the disk 1 rotated therewith. On the side of the transparent or translucent disk 1 opposite the surface on which the light impinges and parallel and preferably adjacent thereto are fiber optics or a holographic plate 13 which direct the light passing through the disk to a stationary sensor 15. The fiber optics or holographic plate 13 rotate with the shaft 2 to project light therethrough onto the stationary sensor 15 which comprises a plurality of light responsive elements. The light responsive elements of the sensor 15 are preaddressed as to their location in known manner so that the particular element or elements thereof onto which the light from the pointer enters provide the x-y position of the light beam. The z-position is determined by the reading of the encoder 9 in standard manner, the z-position being known from the rotational position of the shaft 2.

Referring now to FIG. 5, there is shown a top view of a typical hologram as well as a side view thereof in a spinning configuration as shown in FIG. 2 with the disk 1 removed.

It can be seen that there has been provided an optical pointer which can provide a point indication or other shape in three dimensional space in conjunction with the display of the above noted application as well as locate the three dimensional position of the point in space.

While the invention has been described with respect to a rotating screen in the form of a disk disposed at an angle relative to the x-y plane of the scanned beam, it should be understood that other shapes of screen can be substituted for that disclosed.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modification.

We claim:

1. A pointer for a three dimensional display system, comprising:
   (a) a light source for generating a light beam,
   (b) means to form an image from said light beam in a predetermined two dimensional space and transmit said image along a predetermined path having an axis passing through said space;
   (c) rotating light receiving means having a rotating light receiving surface, the axis of rotation of said surface having a component continuously along said axis for receiving and displaying said image on said first surface, fixed points in said space impinging upon said surface displaying a substantially harmonic motion in a direction along said axis in response to said rotation of said surface; and
   (d) a modulated focused light source movable relative to said axis of said rotating light receiving means.

2. A pointer as set forth in claim 1 further including means responsive to a predetermined position of said rotating light receiving means to control modulation of said modulated light source.

3. A pointer as set forth in claim 1 wherein said modulated focused light source comprises a modulator responsive to a predetermined position of said rotating light receiving means to control modulation and a light source modulated by said modulator.

4. A pointer as set forth in claim 3 wherein said light source is a laser.

5. A pointer as set forth in claim 1 further including means associated with said rotating light receiving means to provide a three dimensional indication of the point of impingement of said light beam on said rotating light receiving means.

6. A pointer as set forth in claim 5, further including a shaft encoder associated with said rotating light receiving means to provide an instantaneous indication of the position of points on said rotating light receiving means in a predetermined direction.

7. A pointer as set forth in claim 6, further including a fiber optic system forming a surface adjacent said rotating light receiving means and on the side thereof opposite said point of impingement to provide an instantaneous indication of the position of points on said rotating light receiving means in a predetermined two dimensional space, said predetermined direction passing through said two dimensional space.

8. A pointer as set forth in claim 6, further including a holographic plate forming a surface adjacent said rotating light receiving means and on the side thereof opposite said point of impingement to provide an instantaneous indication of the position of points on said rotating light receiving means in a predetermined two dimensional space, said predetermined direction passing through said two dimensional space.

9. A pointer as set forth in claim 5, further including a fiber optic system forming a surface adjacent said rotating light receiving means and on the side thereof opposite said point of impingement to provide an instantaneous indication of the position of points on said rotating light receiving means in a predetermined two dimensional space.

10. A pointer as set forth in claim 5, further including a holographic plate forming a surface adjacent said rotating light receiving means and on the side thereof opposite said point of impingement to provide an instantaneous indication of the position of points on said rotating light receiving means in a predetermined two dimensional space, said predetermined direction passing through said two dimensional space.

11. A display system as set forth in claim 1 wherein said rotating light receiving means is a planar member.

12. A display system as set forth in claim 11 wherein said planar member makes an acute angle with a line normal to said x-y plane.

* * * * *